(12) United States Patent
Fu et al.

(10) Patent No.: US 10,823,015 B2
(45) Date of Patent: Nov. 3, 2020

(54) GAS-STEAM COMBINED CYCLE CENTRALIZED HEAT SUPPLY DEVICE AND HEAT SUPPLY METHOD

(71) Applicant: TSINGHUA UNIVERSITY, Beijing (CN)

(72) Inventors: Lin Fu, Beijing (CN); Xiling Zhao, Beijing (CN); Feng Li, Beijing (CN); Shigang Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/910,228

(22) PCT Filed: Sep. 10, 2015

(86) PCT No.: PCT/CN2015/089348
§ 371 (c)(1),
(2) Date: Jul. 14, 2016

(87) PCT Pub. No.: WO2016/110124
PCT Pub. Date: Jul. 14, 2016

(65) Prior Publication Data
US 2018/0223699 A1 Aug. 9, 2018

(30) Foreign Application Priority Data
Jan. 8, 2015 (CN) .......................... 2015 1 0009398

(51) Int. Cl.
*F01K 17/02* (2006.01)
*F01K 23/10* (2006.01)
(Continued)

(52) U.S. Cl.
CPC ............ *F01K 17/025* (2013.01); *F01K 23/10* (2013.01); *F01K 7/16* (2013.01); *F01K 11/02* (2013.01); *Y02E 20/14* (2013.01); *Y02E 20/16* (2013.01)

(58) Field of Classification Search
CPC .......... F01K 17/025; F01K 23/10; F01K 7/16; Y02E 20/14; Y02E 20/16
See application file for complete search history.

(56) References Cited

U.S. PATENT DOCUMENTS 5,799,481 A * 9/1998 Fetescu ................. F01K 17/025
60/39.182

FOREIGN PATENT DOCUMENTS

CN 101858231 A 10/2010
CN 102359739 A 2/2012
(Continued)

*Primary Examiner* — Todd E Manahan
*Assistant Examiner* — Thuyhang N Nguyen
(74) *Attorney, Agent, or Firm* — McCoy Russell LLP

(57) ABSTRACT

The present invention relates to a gas-steam combined cycle centralized heat supply device and a heat supply method. The gas-steam combined cycle centralized heat supply device comprises a gas-steam combined cycle system connected with a thermal station through a heating network return water heating system; the gas-steam combined cycle system comprises a gas turbine connected with a direct contact type flue gas condensation heat exchanger and a steam turbine via a waste heat boiler; the thermal station comprises a hot water type absorption heat pump and a water-water heat exchanger; the heating network return water heating system comprises a steam type absorption heat pump for recovering flue gas waste heat and a steam-water heat exchanger. The present invention can be widely applied to the industry of power plant waste heat recovery.

7 Claims, 4 Drawing Sheets

(51) Int. Cl.
  *F01K 7/16* (2006.01)
  *F01K 11/02* (2006.01)

(56) References Cited

FOREIGN PATENT DOCUMENTS

| | | |
|---|---|---|
| CN | 102878603 A | 1/2013 |
| CN | 204082237 U | 1/2015 |
| CN | 104534539 A | 4/2015 |
| JP | 2007205187 A | 8/2007 |
| KR | 20130091806 A | 8/2013 |

* cited by examiner

GAS-STEAM COMBINED CYCLE CENTRALIZED HEAT SUPPLY DEVICE AND HEAT SUPPLY METHOD

CROSS REFERENCE TO RELATED APPLICATIONS

The present application is a U.S. National Phase of International Patent Application Serial No. PCT/CN2015/089348, entitled "GAS-STEAM COMBINED CYCLE CENTRALIZED HEAT SUPPLY DEVICE AND HEAT SUPPLY METHOD," filed on Sep. 10, 2015, which claims priority to Chinese Patent Application No. 201510009398X, entitled "GAS-STEAM COMBINED CYLCLE CENTRALIZED HEAT SUPPLY DEVICE AND HEAT SUPPLY METHOD," filed on Jan. 8, 2015, the entire contents of each of which are hereby incorporated by reference for all purposes.

FIELD OF THE INVENTION

The present invention relates to a heat supply device and a heat supply method, in particular to a gas-steam combined cycle centralized heat supply device and a heat supply method.

BACKGROUND OF THE INVENTION

Gas-based cogeneration is an energy utilization form for simultaneously producing heat energy and electric energy. It uses high-grade heat energy for generating power and uses low-grade heat energy for supplying heat, such that not only can the utilization efficiency of energy be improved, but also the environmental pollution is reduced. Natural gas is high calorific value clean energy, greenhouse gas and other harmful substances produced during combustion are far fewer than that of other fossil energy, and thereby natural gas cogeneration has a very great application value in the aspect of reducing carbon and emissions which pollute air.

The current gas-steam combined cycle cogeneration system mainly consists of a gas-steam combined cycle (including a gas turbine, a waste heat boiler and a steam turbine), a steam-water heat exchanger and the like. The current gas-based cogeneration centralized heat supply device mainly has the following problems: (1) Heat-to-electricity ratio is low. The ratio of heat to electricity produced by the conventional gas-based cogeneration unit has a certain limitation, the more advanced and higher in conversion efficiency the unit is, the smaller the heat-to-electricity ratio is due to high primary power generation efficiency, and by taking a 100000 kW gas-steam combined cycle as an example, the heat-to-electricity ratio thereof is about 0.7. The low heat-to-electricity ratio means low heat supply efficiency. In order to satisfy the heat supply load, a great amount of natural gas needs to be consumed. Consequently, not only is environmental pollution caused, but also an influence is caused to heat supply safety. (2) Energy loss is great. Flue gas exhaust temperature of the conventional gas-steam combined cycle cogeneration centralized heat supply system is generally 90° C. or even higher, the heat of this part contains a great amount of water vapor vaporization latent heat and the latent heat generally accounts for about 10%-11% of the low calorific value of the natural gas. In addition, heat emitted during flue gas condensation of the steam turbine is taken away by circulating water and is released into the atmosphere, and the heat of this part accounts for about 6%-12% of the low calorific value of the natural gas. (3) Environmental-friendly and landscape effects are poor. As described above, the consumption of a great amount of gas inevitably causes the emission of a great amount of pollutants. In addition, a great amount of water vapor contained in the flue gas causes a scene that a chimney discharges "white smoke", the environment is polluted and the landscape effect is poor.

SUMMARY OF THE INVENTION

Aiming at the above-mentioned problems, the purpose of the present invention is to provide a gas-steam combined cycle centralized heat supply device and a heat supply method which can recover power plant waste heat, improve the comprehensive utilization efficiency of energy and reduce energy consumption and environmental pollution.

In order to realize the above-mentioned purpose, the present invention adopts the following technical solution: a gas-steam combined cycle centralized heat supply device is characterized in that the gas-steam combined cycle centralized heat supply device comprises a gas-steam combined cycle system, a heating network return water heating system and a thermal station, and the gas-steam combined cycle system is connected with the thermal station through the heating network return water heating system;

the gas-steam combined cycle system comprises a gas turbine, a waste heat boiler, a direct contact type flue gas condensation heat exchanger and a steam turbine; an exhaust port of the gas turbine is connected with a flue gas inlet of the waste heat boiler; a flue gas outlet of the waste heat boiler is connected with a flue gas inlet of the direct contact type flue gas condensation heat exchanger, an steam outlet of the waste heat boiler is connected with an extraction steam inlet of the steam turbine, and a drain water inlet of the waste heat boiler is connected with the heating network return water heating system; a first intermediate medium water inlet, a first intermediate medium water outlet, a second intermediate medium water inlet and a second intermediate medium water outlet of the direct contact type flue gas condensation heat exchanger are connected to the heating network return water heating system; an extraction steam outlet of the steam turbine is connected to the heating network return water heating system;

the thermal station comprises a hot water type absorption heat pump and a water-water heat exchanger; and a heating network return water outlet and a heating network supply water inlet of the hot water type absorption heat pump are connected to the heating network return water heating system, a heating network supply water outlet of the hot water type absorption heat pump is connected with a heating network supply water inlet of the water-water heat exchanger, and a heating network return water inlet of the hot water type absorption heat pump is connected with a heating network supply water outlet of the water-water heat exchanger.

The heating network return water heating system comprises a steam type absorption heat pump for recovering flue gas waste heat and a steam-water heat exchanger; a heating network water inlet of the steam type absorption heat pump for recovering flue gas waste heat is connected with the heating network return water outlet of the hot water type absorption heat pump, a heating network water outlet of the steam type absorption heat pump for recovering flue gas waste heat is connected with a heating network water inlet of the steam-water heat exchanger, and a heating network water outlet of the steam-water heat exchanger is connected with the heating network supply water inlet of the hot water type absorption heat pump; and an intermediate medium water outlet and an intermediate medium water inlet of the steam type absorption heat pump for recovering flue gas waste heat are respectively connected with the first intermediate medium water inlet and the first intermediate medium water outlet of the direct contact type flue gas condensation heat exchanger, a drain water outlet of the steam type absorption heat pump for recovering flue gas waste heat and a drain water outlet of the steam-water heat exchanger are connected with the drain water inlet of the waste heat boiler, and an extraction steam inlet of the steam type absorption heat pump for recovering flue gas waste heat and an extraction steam inlet of the steam-water heat exchanger are connected to the extraction steam outlet of the steam turbine.

The heating network return water heating system comprises a steam type absorption heat pump for recovering flue gas waste heat, a steam-water heat exchanger and a power plant water-water heat exchanger; a heating network water inlet of the power plant water-water heat exchanger is connected with the heating network return water outlet of the hot water type absorption heat pump, and a heating network water outlet of the power plant water-water heat exchanger is connected with a heating network water inlet of the steam type absorption heat pump for recovering flue gas waste heat; a heating network water outlet of the steam type absorption heat pump for recovering flue gas waste heat is connected with a heating network water inlet of the steam-water heat exchanger, and a heating network water outlet of the steam-water heat exchanger is connected with a heating network supply water inlet of the hot water type absorption heat pump; an intermediate medium water outlet and an intermediate medium water inlet of the steam type absorption heat pump for recovering flue gas waste heat are respectively connected with the first intermediate medium water inlet and the first intermediate medium water outlet of the direct contact type flue gas condensation heat exchanger; an intermediate medium water outlet and an intermediate medium water inlet of the power plant water-water heat exchanger are respectively connected with the second intermediate medium water inlet and the second intermediate medium water outlet of the direct contact type flue gas condensation heat exchanger; and a drain water outlet of the steam type absorption heat pump for recovering flue gas waste heat and a drain water outlet of the steam-water heat exchanger are connected to the drain water inlet of the waste heat boiler, and an extraction steam inlet of the steam type absorption heat pump for recovering flue gas waste heat and an extraction steam inlet of the steam-water heat exchanger are connected to the extraction steam outlet of the steam turbine.

The heating network return water heating system comprises a steam type absorption heat pump for recovering flue gas waste heat, a steam-water heat exchanger, a power plant water-water heat exchanger and a condenser; a heating network water inlet of the power plant water-water heat exchanger is connected with the heating network return water outlet of the hot water type absorption heat pump, and a heating network water outlet of the power plant water-water heat exchanger is connected with a heating network water inlet of the condenser; a heating network water outlet of the condenser is connected with a heating network water inlet of the steam type absorption heat pump for recovering flue gas waste heat; a heating network water outlet of the steam type absorption heat pump for recovering flue gas waste heat is connected with a heating network water inlet of the steam-water heat exchanger; a heating network water outlet of the steam-water heat exchanger is connected with the heating network supply water inlet of the hot water type absorption heat pump in the thermal station; an intermediate medium water outlet and an intermediate medium water inlet of the steam type absorption heat pump for recovering flue gas waste heat are respectively connected with the first intermediate medium water inlet and the first intermediate medium water outlet of the direct contact type flue gas condensation heat exchanger; an intermediate medium water outlet and an intermediate medium water inlet of the power plant water-water heat exchanger are respectively connected with the second intermediate medium water inlet and the second intermediate medium water outlet of the direct contact type flue gas condensation heat exchanger; a drain water outlet of the steam type absorption heat pump for recovering flue gas waste heat, a drain water outlet of the steam-water heat exchanger and a drain water outlet of the condenser are connected to the drain water inlet of the waste heat boiler; an extraction steam inlet of the steam type absorption heat pump for recovering flue gas waste heat and an extraction steam inlet of the steam-water heat exchanger are connected to the extraction steam outlet of the steam turbine; and an exhaust steam inlet of the condenser is connected to an exhaust steam outlet of the steam turbine.

The heating network return water heating system comprises a steam type absorption heat pump for recovering flue gas waste heat, a steam-water heat exchanger, a power plant water-water heat exchanger and a condenser; a heating network water inlet of the condenser is connected with the heating network return water outlet of the hot water type absorption heat pump, a heating network water outlet of the condenser is connected with a heating network water inlet of the power plant water-water heat exchanger, and a heating network water outlet of the power plant water-water heat exchanger is connected with a heating network water inlet of the steam type absorption heat pump for recovering flue gas waste heat; a heating network water outlet of the steam type absorption heat pump for recovering flue gas waste heat is connected with a heating network water inlet of the steam-water heat exchanger, and a heating network water outlet of the steam-water heat exchanger is connected with the heating network supply water inlet of the hot water type absorption heat pump; an intermediate medium water outlet and an intermediate medium water inlet of the steam type absorption heat pump for recovering flue gas waste heat are respectively connected with the first intermediate medium water inlet and the first intermediate medium water outlet of the direct contact type flue gas condensation heat exchanger; an intermediate medium water outlet and an intermediate medium water inlet of the power plant water-water heat exchanger are respectively connected with the second intermediate medium water inlet and the second intermediate medium water outlet of the direct contact type flue gas condensation heat exchanger; a drain water outlet of the steam type absorption heat pump for recovering flue gas waste heat, a drain water outlet of the steam-water heat exchanger and a drain water outlet of the condenser are connected to the drain water inlet of the waste heat boiler, and an extraction steam inlet of the steam type absorption heat pump for recovering flue gas waste heat and an extraction steam inlet of the steam-water heat exchanger are connected to the extraction steam outlet of the steam turbine; and an exhaust steam inlet of the condenser is connected to an exhaust steam outlet of the steam turbine.

The heating network return water heating system comprises a steam type absorption heat pump for recovering flue gas waste heat, a steam-water heat exchanger, a power plant water-water heat exchanger and a condenser; a heating network water inlet of the power plant water-water heat exchanger and a heating network water inlet of the condenser are connected with the heating network return water outlet of the hot water type absorption heat pump; a heating network water outlet of the power plant water-water heat exchanger and a heating network water outlet of the condenser are connected with a heating network water inlet of the steam type absorption heat pump for recovering flue gas waste heat, and a heating network water outlet of the steam type absorption heat pump for recovering flue gas waste heat is connected with a heating network water inlet of the steam-water heat exchanger; a heating network water outlet of the steam-water heat exchanger is connected with a heating network supply water inlet of the hot water type absorption heat pump; an intermediate medium water outlet and an intermediate medium water inlet of the steam type absorption heat pump for recovering flue gas waste heat are respectively connected with the first intermediate medium water inlet and the first intermediate medium water outlet of the direct contact type flue gas condensation heat exchanger; an intermediate medium water outlet and an intermediate medium water inlet of the power plant water-water heat exchanger are respectively connected with the second intermediate medium water inlet and the second intermediate medium water outlet of the direct contact type flue gas condensation heat exchanger; a drain water outlet of the steam type absorption heat pump for recovering flue gas waste heat, a drain water outlet of the steam-water heat exchanger and a drain water outlet of the condenser are connected to the drain water inlet of the waste heat boiler; an extraction steam inlet of the steam type absorption heat pump for recovering flue gas waste heat and an extraction steam inlet of the steam-water heat exchanger are connected to the extraction steam outlet of the steam turbine; and an exhaust steam inlet of the condenser is connected to an exhaust steam outlet of the steam turbine.

The heating network return water heating system comprises a steam type absorption heat pump for recovering flue gas waste heat, a steam-water heat exchanger, a condenser and a steam type absorption heat pump for recovering exhaust steam waste heat; a heating network water inlet of the steam type absorption heat pump for recovering exhaust steam waste heat is connected with the heating network return water outlet of the hot water type absorption heat pump, and a heating network water outlet of the steam type absorption heat pump for recovering exhaust steam waste heat is connected with a heating network water inlet of the steam type absorption heat pump for recovering flue gas waste heat; an intermediate cooling circulating water outlet and an intermediate cooling circulating water inlet of the steam type absorption heat pump for recovering exhaust steam waste heat are respectively connected with an intermediate cooling circulating water inlet and an intermediate cooling circulating water outlet of the condenser; a heating network water outlet of the steam type absorption heat pump for recovering flue gas waste heat is connected with a heating network water inlet of the steam-water heat exchanger; a heating network water outlet of the steam-water heat exchanger is connected with a heating network supply water inlet of the hot water type absorption heat pump; an intermediate medium water outlet and an intermediate medium water inlet of the steam type absorption heat pump for recovering flue gas waste heat are respectively connected with the first intermediate medium water inlet and the first intermediate medium water outlet of the direct contact type flue gas condensation heat exchanger; a drain water outlet of the steam type absorption heat pump for recovering flue gas waste heat, a drain water outlet of the steam-water heat exchanger, a drain water outlet of the condenser and a drain water outlet of the steam type absorption heat pump for recovering exhaust steam waste heat are connected to the drain water inlet of the waste heat boiler; an extraction steam inlet of the steam type absorption heat pump for recovering flue gas waste heat, an extraction steam inlet of the steam-water heat exchanger and an extraction steam inlet of the steam type absorption heat pump for recovering exhaust steam waste heat are connected to the extraction steam outlet of the steam turbine; and an exhaust steam inlet of the condenser is connected to an exhaust steam outlet of the steam turbine.

The heating network return water heating system comprises a steam type absorption heat pump for recovering flue gas waste heat, a steam-water heat exchanger, a power plant water-water heat exchanger, a condenser and a steam type absorption heat pump for recovering exhaust steam waste heat; a heating network water inlet of the power plant water-water heat exchanger is connected with the heating network return water outlet of the hot water type absorption heat pump, and a heating network water outlet of the power plant water-water heat exchanger is connected with a heating network water inlet of the steam type absorption heat pump for recovering exhaust steam waste heat; a heating network water outlet of the steam type absorption heat pump for recovering exhaust steam waste heat is connected with a heating network water inlet of the steam type absorption heat pump for recovering flue gas waste heat; an intermediate cooling circulating water outlet and an intermediate cooling circulating water inlet of the steam type absorption heat pump for recovering exhaust steam waste heat are respectively connected with an intermediate cooling circulating water inlet and an intermediate cooling circulating water outlet of the condenser; a heating network water outlet of the steam type absorption heat pump for recovering flue gas waste heat is connected with a heating network water inlet of the steam-water heat exchanger; a heating network water outlet of the steam-water heat exchanger is connected with the heating network supply water inlet of the hot water type absorption heat pump; an intermediate medium water outlet and an intermediate medium water inlet of the steam type absorption heat pump for recovering flue gas waste heat are respectively connected with the first intermediate medium water inlet and the first intermediate medium water outlet of the direct contact type flue gas condensation heat exchanger; an intermediate medium water outlet and an intermediate medium water inlet of the power plant water-water heat exchanger are respectively connected with the second intermediate medium water inlet and the second intermediate medium water outlet of the direct contact type flue gas condensation heat exchanger; a drain water outlet of the steam type absorption heat pump for recovering flue gas waste heat, a drain water outlet of the steam-water heat exchanger, a drain water outlet of the condenser and a drain water outlet of the team type absorption heat pump for recovering exhaust steam waste heat are connected to the drain water inlet of the waste heat boiler; an extraction steam inlet of the steam type absorption heat pump for recovering flue gas waste heat, an extraction steam inlet of the steam-water heat exchanger and an extraction steam inlet of the steam type absorption heat pump for recovering exhaust steam waste heat are connected to the extraction steam outlet of the steam turbine; and an exhaust steam inlet of the condenser is connected to an exhaust steam outlet of the steam turbine.

The heating network return water heating system comprises a steam type absorption heat pump for recovering flue gas waste heat, a steam-water heat exchanger, a power plant water-water heat exchanger, a condenser and a steam type absorption heat pump for recovering exhaust steam waste heat; a heating network water inlet of the condenser is connected with the heating network return water outlet of the hot water type absorption heat pump; a heating network water outlet of the condenser is connected with a heating network water inlet of the power plant water-water heat exchanger; a heating network water outlet of the power plant water-water heat exchanger is connected with a heating network water inlet of the steam type absorption heat pump for recovering flue gas waste heat; a heating network water outlet of the steam type absorption heat pump for recovering flue gas waste heat is connected with a heating network water inlet of the steam type absorption heat pump for recovering exhaust steam waste heat; a heating network water outlet of the steam type absorption heat pump for recovering exhaust steam waste heat is connected with a heating network water inlet of the steam-water heat exchanger, an intermediate cooling circulating water outlet and an intermediate cooling circulating water inlet of the steam type absorption heat pump for recovering exhaust steam waste heat are respectively connected with an intermediate cooling circulating water inlet and an intermediate cooling circulating water outlet of the condenser; a heating network water outlet of the steam-water heat exchanger is connected with a heating network supply water inlet of the hot water type absorption heat pump; a drain water outlet of the steam type absorption heat pump for recovering flue gas waste heat, a drain water outlet of the steam-water heat exchanger, a drain water outlet of the condenser and a drain water outlet of the steam type absorption heat pump for recovering exhaust steam waste heat are connected to the drain water inlet of the waste heat boiler; an extraction steam inlet of the steam type absorption heat pump for recovering flue gas waste heat, an extraction steam inlet of the steam-water heat exchanger and an extraction steam inlet of the steam type absorption heat pump for recovering exhaust steam waste heat are connected to the extraction steam outlet of the steam turbine; and an exhaust steam inlet of the condenser is connected to an exhaust steam outlet of the steam turbine.

A heat supply method of the gas-steam combined cycle centralized heat supply device comprises the following steps: 1) in a gas-steam combined cycle system, natural gas and air are mixed and combusted in a combustion chamber of a gas turbine to produce high-temperature flue gas, and the high-temperature flue gas flows into a combustion turbine of the gas turbine to expand to do work and drive a power generator to generate power; after doing work, the flue gas enters a waste heat boiler to heat boiler supply water in the waste heat boiler so as to produce high-temperature steam in the waste heat boiler; the flue gas exhausted from the waste heat boiler enters a direct contact type flue gas condensation heat exchanger, is cooled and then is exhausted into the atmosphere, the high-temperature steam produced in the waste heat boiler enters a steam turbine to do work to generate power, extraction steam is extracted from the steam turbine and the extracted extraction steam enters a heating network return water heating system; 2) user return water entering a thermal station is used as heating network low-temperature return water which is drained from the thermal station, enters the heating network return water heating system and is heated in the heating network return water heating system, and the heated heating network low-temperature return water is used as heating network high-temperature supply water which is returned to the thermal station, wherein intermediate medium water produced in the heating network return water heating system enters the direct contact type flue gas condensation heat exchanger and is heated by flue gas in the direct contact type flue gas condensation heat exchanger, and the heated intermediate medium water is returned to the heating network return water heating system; and extraction steam condensate produced in the heating network return water heating system is returned to the steam boiler; 3) the heating network high-temperature supply water returned to the thermal station is firstly used as a driving heat source, enters a hot water type absorption heat pump, emits heat and is cooled in the hot water type absorption heat pump, then enters a water-water heat exchanger in the thermal station to heat user supply water, is cooled in the water-water heat exchanger in the thermal station, then again enters the hot water type absorption heat pump as low-grade heat source, finally emits heat and is cooled to the initial temperature of heating network low-temperature return water and again is used as the heating network low-temperature return water to enter the heating network return water heating system from the thermal station.

By adopting the above-mentioned technical solution, the present invention has the following advantages: 1) since apparatuses such as the direct contact type flue gas condensation heat exchanger, the steam type absorption heat pump for recovering flue gas waste heat, the steam type absorption heat pump for recovering exhaust steam waste heat and the condenser are adopted by the present invention, the flue gas condensation and vaporization latent heat and exhaust steam waste heat can be effectively recovered, the exhaust flue gas temperature is reduced and the environmental pollution is reduced; 2) since the water-water heat exchanger, the steam-water heat exchanger and the like are adopted by the present invention to heat the heating network low-temperature return water in the power plant, the flue gas condensation waste heat of the waste heat boiler and the exhaust steam waste heat of the condenser are fully recovered by cyclically utilizing the intermediate medium water and the extraction steam condensate during heating, and the waste of energy is further reduced; 3) since the combination of the hot water type absorption heat pump and the water-water heat exchanger is adopted in the thermal station by the present invention, the heat of the heating network high-temperature supply water is effectively utilized, the user supply water is simultaneously heated, the cascade utilization of energy is realized and the effective utilization rate of energy is comprehensively improved. To sum up, the present invention can be widely applied to the industry of power plant waste heat recovery and improvement of comprehensive energy utilization efficiency.

DESCRIPTION OF THE PREFERRED EMBODIMENTS

The present invention will be described below in detail in combination with the drawings and the embodiments.

Figure 1:
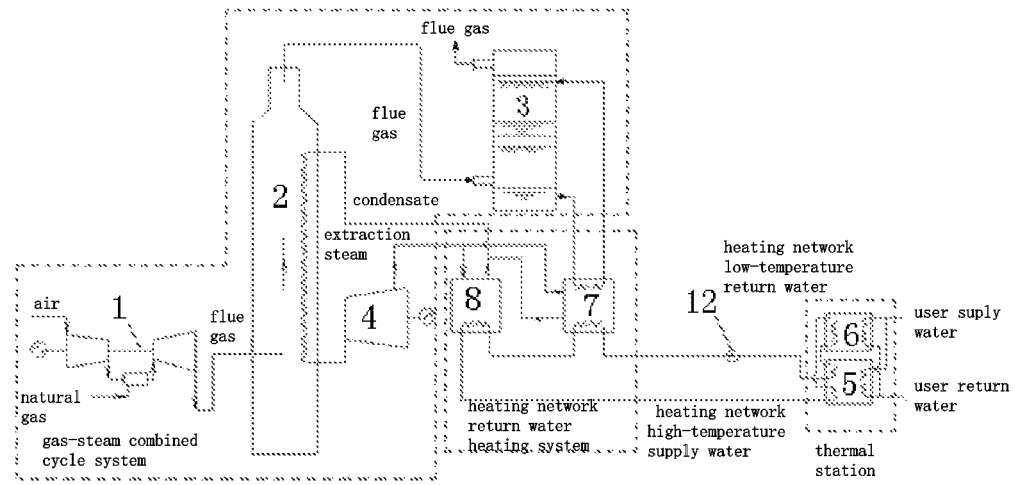
FIG. 1 illustrates an overall schematic diagram of a first gas-steam combined cycle centralized heat supply device of the present invention.

As shown in FIG. 1, the present invention provides a gas-steam combined cycle centralized heat supply device, which comprises a gas-steam combined cycle system, a thermal station and a heating network return water heating system; and the gas-steam combined cycle system is connected with the thermal station through the heating network return water heating system.

The gas-steam combined cycle system comprises a gas turbine 1, a waste heat boiler 2, a direct contact type flue gas condensation heat exchanger 3 and a steam turbine 4. An exhaust port of the gas turbine 1 is connected with a flue gas inlet of the waste heat boiler 2. A flue gas outlet of the waste heat boiler 2 is connected with a flue gas inlet of the direct contact type flue gas condensation heat exchanger 3, an steam outlet of the waste heat boiler 2 is connected with an extraction steam inlet of the steam turbine 4, and a drain water inlet of the waste heat boiler 2 is connected with the heating network return water heating system. A first intermediate medium water inlet, a first intermediate medium water outlet, a second intermediate medium water inlet and a second intermediate medium water outlet of the direct contact type flue gas condensation heat exchanger 3 are connected to the heating network return water heating system; and an extraction steam outlet of the steam turbine 4 is connected to the heating network return water heating system.

The thermal station comprises a hot water type absorption heat pump 5 and a water-water heat exchanger 6. A heating network return water outlet and a heating network supply water inlet of the hot water type absorption heat pump 5 are connected to the heating network return water heating system, a heating network supply water outlet of the hot water type absorption heat pump 5 is connected with a heating network supply water inlet of the water-water heat exchanger 6, and a heating network return water inlet of the hot water type absorption heat pump 5 is connected with a heating network supply water outlet of the water-water heat exchanger 6.

As shown in FIG. 1, the heating network return water heating system of the present invention comprises a steam type absorption heat pump 7 for recovering flue gas waste heat and a steam-water heat exchanger 8. A heating network water inlet of the steam type absorption heat pump 7 for recovering flue gas waste heat is connected with the heating network return water outlet of the hot water type absorption heat pump 5, a heating network water outlet of the steam type absorption heat pump 7 for recovering flue gas waste heat is connected with a heating network water inlet of the steam-water heat exchanger 8, and a heating network water outlet of the steam-water heat exchanger 8 is connected with the heating network supply water inlet of the hot water type absorption heat pump 5. An intermediate medium water outlet and an intermediate medium water inlet of the steam type absorption heat pump 7 for recovering flue gas waste heat are respectively connected with the first intermediate medium water inlet and the first intermediate medium water outlet of the direct contact type flue gas condensation heat exchanger 3, a drain water outlet of the steam type absorption heat pump 7 for recovering flue gas waste heat and a drain water outlet of the steam-water heat exchanger 8 are connected with the drain water inlet of the waste heat boiler 2, and an extraction steam inlet of the steam type absorption heat pump 7 for recovering flue gas waste heat and an extraction steam inlet of the steam-water heat exchanger 8 are connected to the extraction steam outlet of the steam turbine 4.

Figure 2:
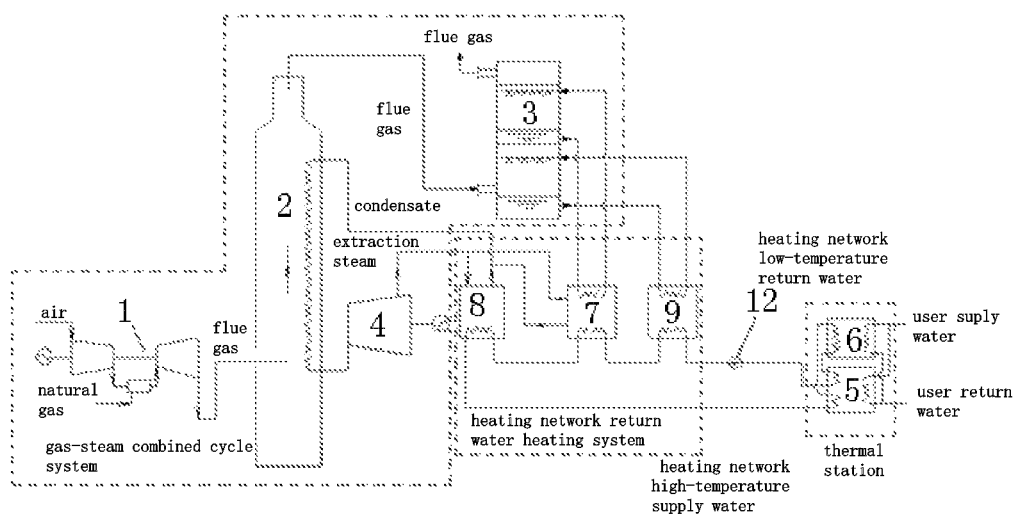
FIG. 2 illustrates an overall schematic diagram of a second gas-steam combined cycle centralized heat supply device of the present invention.

In one preferred embodiment, as shown in FIG. 2, the heating network return water heating system comprises a steam type absorption heat pump 7 for recovering flue gas waste heat, a steam-water heat exchanger 8 and a power plant water-water heat exchanger 9. A heating network water inlet of the power plant water-water heat exchanger 9 is connected with the heating network return water outlet of the hot water type absorption heat pump 5, and a heating network water outlet of the power plant water-water heat exchanger 9 is connected with a heating network water inlet of the steam type absorption heat pump 7 for recovering flue gas waste heat. A heating network water outlet of the steam type absorption heat pump 7 for recovering flue gas waste heat is connected with a heating network water inlet of the steam-water heat exchanger 8, and a heating network water outlet of the steam-water heat exchanger 8 is connected with a heating network supply water inlet of the hot water type absorption heat pump 5. An intermediate medium water outlet and an intermediate medium water inlet of the steam type absorption heat pump 7 for recovering flue gas waste heat are respectively connected with the first intermediate medium water inlet and the first intermediate medium water outlet of the direct contact type flue gas condensation heat exchanger 3; an intermediate medium water outlet and an intermediate medium water inlet of the power plant water-water heat exchanger 9 are respectively connected with the second intermediate medium water inlet and the second intermediate medium water outlet of the direct contact type flue gas condensation heat exchanger 3; and a drain water outlet of the steam type absorption heat pump 7 for recovering flue gas waste heat and a drain water outlet of the steam-water heat exchanger 8 are connected to the drain water inlet of the waste heat boiler 2, and an extraction steam inlet of the steam type absorption heat pump 7 for recovering flue gas waste heat and an extraction steam inlet of the steam-water heat exchanger 8 are connected to the extraction steam outlet of the steam turbine 4.

Figure 3:
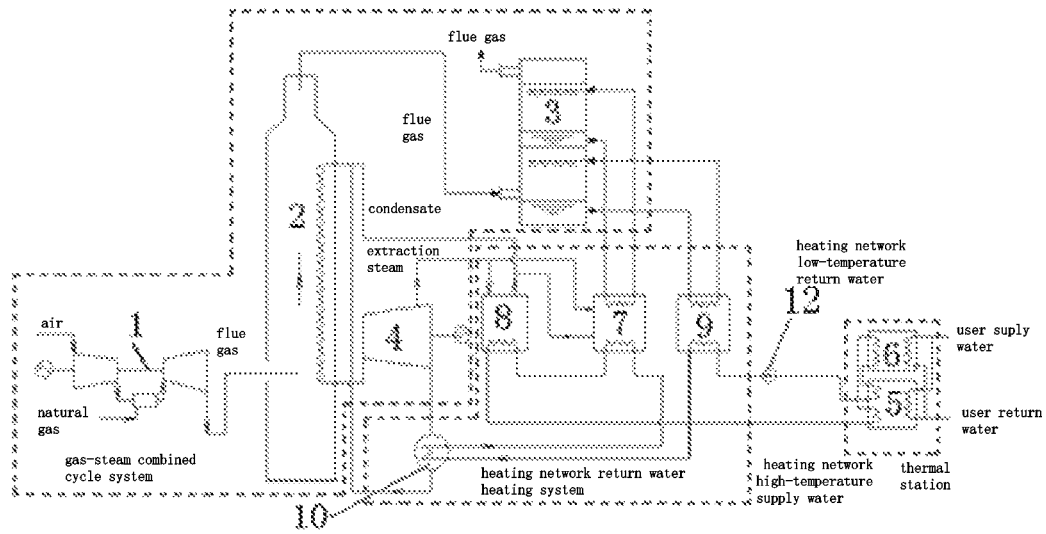
FIG. 3 illustrates an overall schematic diagram of a third gas-steam combined cycle centralized heat supply device of the present invention.

In one preferred embodiment, as shown in FIG. 3, the heating network return water heating system comprises a steam type absorption heat pump 7 for recovering flue gas waste heat, a steam-water heat exchanger 8, a power plant water-water heat exchanger 9 and a condenser 10. A heating network water inlet of the power plant water-water heat exchanger 9 is connected with the heating network return water outlet of the hot water type absorption heat pump 5, and a heating network water outlet of the power plant water-water heat exchanger 9 is connected with a heating network water inlet of the condenser 10. A heating network water outlet of the condenser 10 is connected with a heating network water inlet of the steam type absorption heat pump 7 for recovering flue gas waste heat; a heating network water outlet of the steam type absorption heat pump 7 for recovering flue gas waste heat is connected with a heating network water inlet of the steam-water heat exchanger 8; and a heating network water outlet of the steam-water heat exchanger 8 is connected with the heating network supply water inlet of the hot water type absorption heat pump 5 in the thermal station. An intermediate medium water outlet and an intermediate medium water inlet of the steam type absorption heat pump 7 for recovering flue gas waste heat are respectively connected with the first intermediate medium water inlet and the first intermediate medium water outlet of the direct contact type flue gas condensation heat exchanger 3; an intermediate medium water outlet and an intermediate medium water inlet of the power plant water-water heat exchanger 9 are respectively connected with the second intermediate medium water inlet and the second intermediate medium water outlet of the direct contact type flue gas condensation heat exchanger 3; a drain water outlet of the steam type absorption heat pump 7 for recovering flue gas waste heat, a drain water outlet of the steam-water heat exchanger 8 and a drain water outlet of the condenser 10 are connected to the drain water inlet of the waste heat boiler 2; an extraction steam inlet of the steam type absorption heat pump 7 for recovering flue gas waste heat and an extraction steam inlet of the steam-water heat exchanger 8 are connected to the extraction steam outlet of the steam turbine 4; and an exhaust steam inlet of the condenser 10 is connected to an exhaust steam outlet of the steam turbine 4.

Figure 4:
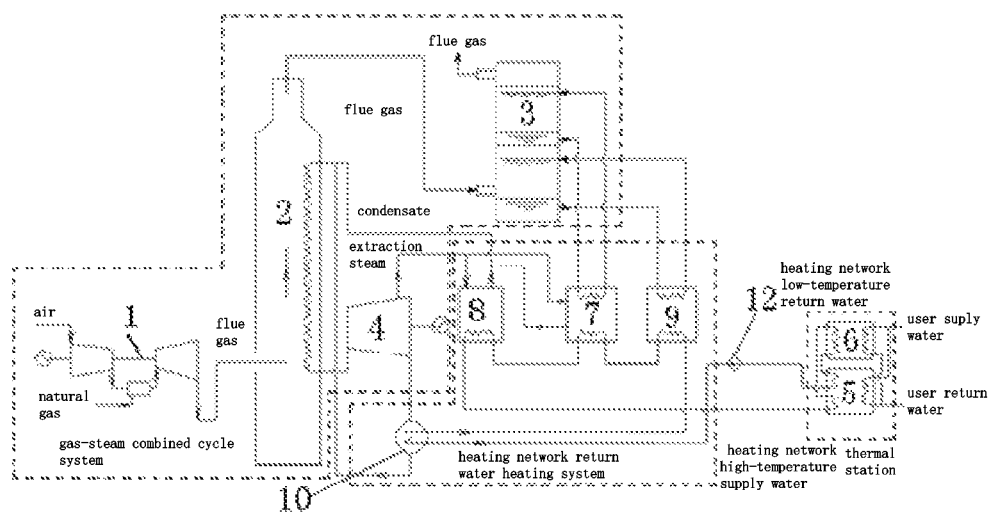
FIG. 4 illustrates an overall schematic diagram of a fourth gas-steam combined cycle centralized heat supply device of the present invention.

In one preferred embodiment, as shown in FIG. 4, the heating network return water heating system comprises a steam type absorption heat pump 7 for recovering flue gas waste heat, a steam-water heat exchanger 8, a power plant water-water heat exchanger 9 and a condenser 10. A heating network water inlet of the condenser 10 is connected with the heating network return water outlet of the hot water type absorption heat pump 5, a heating network water outlet of the condenser 10 is connected with a heating network water inlet of the power plant water-water heat exchanger 9, and a heating network water outlet of the power plant water-water heat exchanger 9 is connected with a heating network water inlet of the steam type absorption heat pump 7 for recovering flue gas waste heat; and a heating network water outlet of the steam type absorption heat pump 7 for recovering flue gas waste heat is connected with a heating network water inlet of the steam-water heat exchanger 9, and a heating network water outlet of the steam-water heat exchanger 8 is connected with the heating network supply water inlet of the hot water type absorption heat pump 5. An intermediate medium water outlet and an intermediate medium water inlet of the steam type absorption heat pump 7 for recovering flue gas waste heat are respectively connected with the first intermediate medium water inlet and the first intermediate medium water outlet of the direct contact type flue gas condensation heat exchanger 3; an intermediate medium water outlet and an intermediate medium water inlet of the power plant water-water heat exchanger 9 are respectively connected with the second intermediate medium water inlet and the second intermediate medium water outlet of the direct contact type flue gas condensation heat exchanger 3; a drain water outlet of the steam type absorption heat pump 7 for recovering flue gas waste heat, a drain water outlet of the steam-water heat exchanger 8 and a drain water outlet of the condenser 10 are connected to the drain water inlet of the waste heat boiler 2, and an extraction steam inlet of the steam type absorption heat pump 7 for recovering flue gas waste heat and an extraction steam inlet of the steam-water heat exchanger 8 are connected to the extraction steam outlet of the steam turbine 4; and an exhaust steam inlet of the condenser 10 is connected to an exhaust steam outlet of the steam turbine 4.

Figure 5:
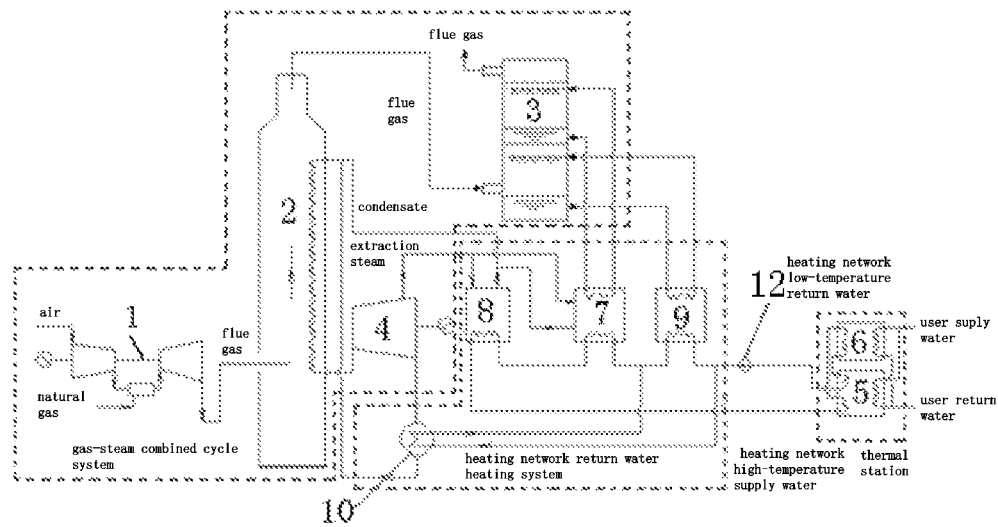
FIG. 5 illustrates an overall schematic diagram of a fifth gas-steam combined cycle centralized heat supply device of the present invention.

In one preferred embodiment, as shown in FIG. 5, the heating network return water heating system comprises a steam type absorption heat pump 7 for recovering flue gas waste heat, a steam-water heat exchanger 8, a power plant water-water heat exchanger 9 and a condenser 10. A heating network water inlet of the power plant water-water heat exchanger 9 and a heating network water inlet of the condenser 10 are connected with the heating network return water outlet of the hot water type absorption heat pump 5; a heating network water outlet of the power plant water-water heat exchanger 9 and a heating network water outlet of the condenser 10 are connected with a heating network water inlet of the steam type absorption heat pump 7 for recovering flue gas waste heat, and a heating network water outlet of the steam type absorption heat pump 7 for recovering flue gas waste heat is connected with a heating network water inlet of the steam-water heat exchanger 8; and a heating network water outlet of the steam-water heat exchanger 8 is connected with a heating network supply water inlet of the hot water type absorption heat pump 5. An intermediate medium water outlet and an intermediate medium water inlet of the steam type absorption heat pump 7 for recovering flue gas waste heat are respectively connected with the first intermediate medium water inlet and the first intermediate medium water outlet of the direct contact type flue gas condensation heat exchanger 3; an intermediate medium water outlet and an intermediate medium water inlet of the power plant water-water heat exchanger 9 are respectively connected with the second intermediate medium water inlet and the second intermediate medium water outlet of the direct contact type flue gas condensation heat exchanger 3; a drain water outlet of the steam type absorption heat pump 7 for recovering flue gas waste heat, a drain water outlet of the steam-water heat exchanger 8 and a drain water outlet of the condenser 10 are connected to the drain water inlet of the waste heat boiler 2; an extraction steam inlet of the steam type absorption heat pump 7 for recovering flue gas waste heat and an extraction steam inlet of the steam-water heat exchanger 8 are connected to the extraction steam outlet of the steam turbine 4; and an exhaust steam inlet of the condenser 10 is connected to an exhaust steam outlet of the steam turbine 4.

Figure 6:
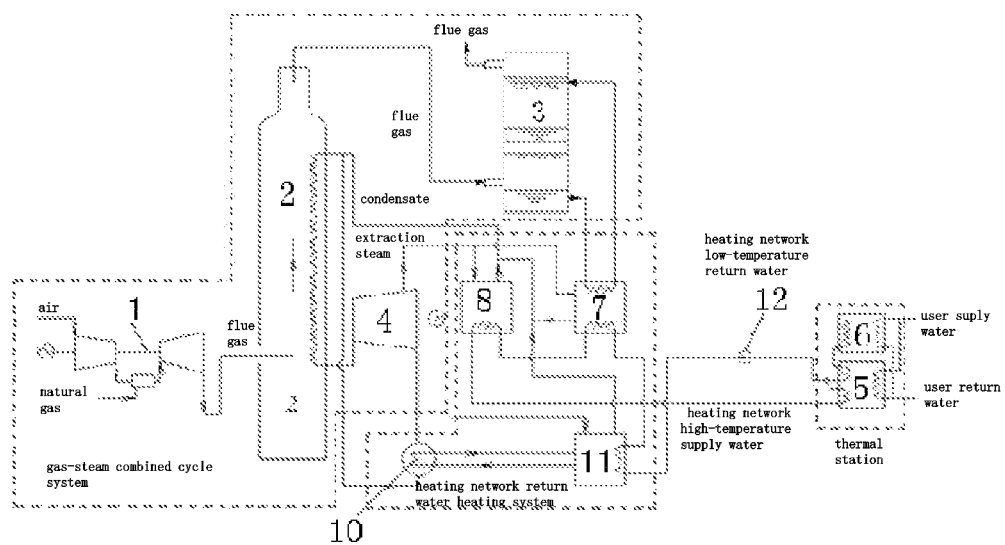
FIG. 6 illustrates an overall schematic diagram of a sixth gas-steam combined cycle centralized heat supply device of the present invention.

In one preferred embodiment, as shown in FIG. 6, the heating network return water heating system comprises a steam type absorption heat pump 7 for recovering flue gas waste heat, a steam-water heat exchanger 8, a condenser 10 and a steam type absorption heat pump 11 for recovering exhaust steam waste heat. A heating network water inlet of the steam type absorption heat pump 11 for recovering exhaust steam waste heat is connected with the heating network return water outlet of the hot water type absorption heat pump 5, and a heating network water outlet of the steam type absorption heat pump 11 for recovering exhaust steam waste heat is connected with a heating network water inlet of the steam type absorption heat pump 7 for recovering flue gas waste heat; and an intermediate cooling circulating water outlet and an intermediate cooling circulating water inlet of the steam type absorption heat pump 11 for recovering exhaust steam waste heat are respectively connected with an intermediate cooling circulating water inlet and an intermediate cooling circulating water outlet of the condenser 10. A heating network water outlet of the steam type absorption heat pump 7 for recovering flue gas waste heat is connected with a heating network water inlet of the steam-water heat exchanger 8; and a heating network water outlet of the steam-water heat exchanger 8 is connected with a heating network supply water inlet of the hot water type absorption heat pump 5. An intermediate medium water outlet and an intermediate medium water inlet of the steam type absorption heat pump 7 for recovering flue gas waste heat are respectively connected with the first intermediate medium water inlet and the first intermediate medium water outlet of the direct contact type flue gas condensation heat exchanger 3; a drain water outlet of the steam type absorption heat pump 7 for recovering flue gas waste heat, a drain water outlet of the steam-water heat exchanger 8, a drain water outlet of the condenser 10 and a drain water outlet of the steam type absorption heat pump 11 for recovering exhaust steam waste heat are connected to the drain water inlet of the waste heat boiler 2; an extraction steam inlet of the steam type absorption heat pump 7 for recovering flue gas waste heat, an extraction steam inlet of the steam-water heat exchanger 8 and an extraction steam inlet of the steam type absorption heat pump 11 for recovering exhaust steam waste heat are connected to the extraction steam outlet of the steam turbine 4; and an exhaust steam inlet of the condenser 10 is connected to an exhaust steam outlet of the steam turbine 4.

Figure 7:
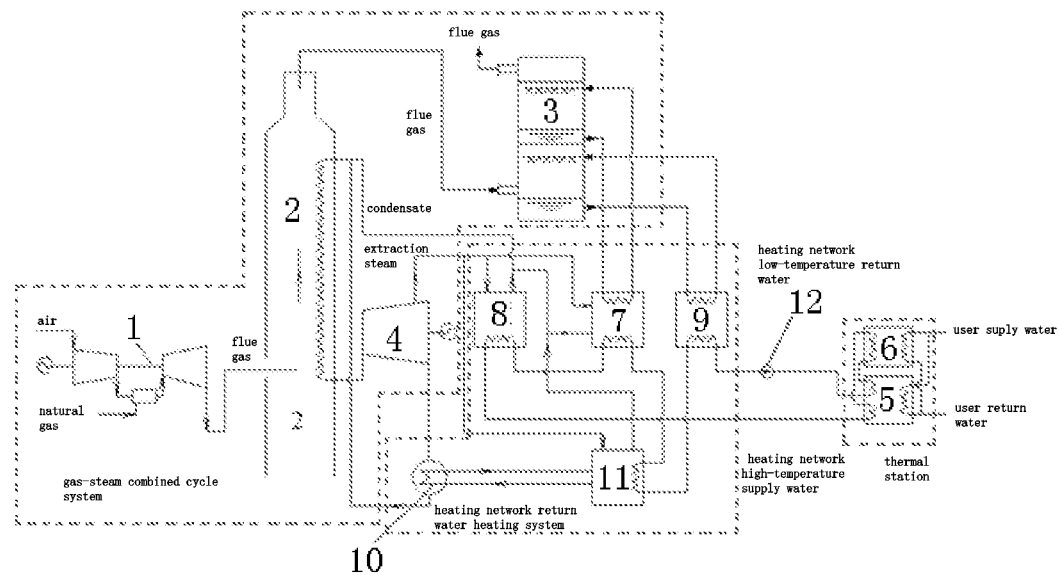
FIG. 7 illustrates an overall schematic diagram of a seventh gas-steam combined cycle centralized heat supply device of the present invention.

In one preferred embodiment, as shown in FIG. 7, the heating network return water heating system comprises a steam type absorption heat pump 7 for recovering flue gas waste heat, a steam-water heat exchanger 8, a power plant water-water heat exchanger 9, a condenser 10 and a steam type absorption heat pump 11 for recovering exhaust steam waste heat. A heating network water inlet of the power plant water-water heat exchanger 9 is connected with the heating network return water outlet of the hot water type absorption heat pump 5, and a heating network water outlet of the power plant water-water heat exchanger 9 is connected with a heating network water inlet of the steam type absorption heat pump 11 for recovering exhaust steam waste heat; a heating network water outlet of the steam type absorption heat pump 11 for recovering exhaust steam waste heat is connected with a heating network water inlet of the steam type absorption heat pump 7 for recovering flue gas waste heat; and an intermediate cooling circulating water outlet and an intermediate cooling circulating water inlet of the steam type absorption heat pump 11 for recovering exhaust steam waste heat are respectively connected with an intermediate cooling circulating water inlet and an intermediate cooling circulating water outlet of the condenser 10. A heating network water outlet of the steam type absorption heat pump 7 for recovering flue gas waste heat is connected with a heating network water inlet of the steam-water heat exchanger 8; and a heating network water outlet of the steam-water heat exchanger 8 is connected with the heating network supply water inlet of the hot water type absorption heat pump 5. An intermediate medium water outlet and an intermediate medium water inlet of the steam type absorption heat pump 7 for recovering flue gas waste heat are respectively connected with the first intermediate medium water inlet and the first intermediate medium water outlet of the direct contact type flue gas condensation heat exchanger 3; an intermediate medium water outlet and an intermediate medium water inlet of the power plant water-water heat exchanger 9 are respectively connected with the second intermediate medium water inlet and the second intermediate medium water outlet of the direct contact type flue gas condensation heat exchanger 3; a drain water outlet of the steam type absorption heat pump 7 for recovering flue gas waste heat, a drain water outlet of the steam-water heat exchanger 8, a drain water outlet of the condenser 10 and a drain water outlet of the steam type absorption heat pump 11 for recovering exhaust steam waste heat are connected to the drain water inlet of the waste heat boiler 2; an extraction steam inlet of the steam type absorption heat pump 7 for recovering flue gas waste heat, an extraction steam inlet of the steam-water heat exchanger 8 and an extraction steam inlet of the steam type absorption heat pump 11 for recovering exhaust steam waste heat are connected to the extraction steam outlet of the steam turbine 4; and an exhaust steam inlet of the condenser 10 is connected to an exhaust steam outlet of the steam turbine 4.

Figure 8:
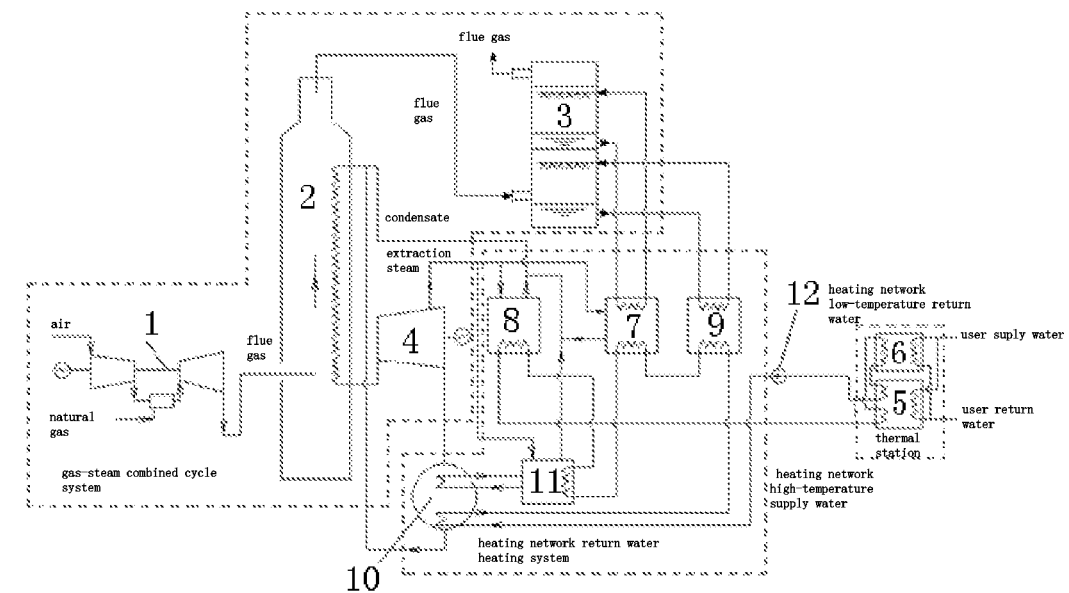
FIG. 8 illustrates an overall schematic diagram of an eighth gas-steam combined cycle centralized heat supply device of the present invention.

In one preferred embodiment, as shown in FIG. 8, the heating network return water heating system comprises a steam type absorption heat pump 7 for recovering flue gas waste heat, a steam-water heat exchanger 8, a power plant water-water heat exchanger 9, a condenser 10 and a steam type absorption heat pump 11 for recovering exhaust steam waste heat. A heating network water inlet of the condenser 10 is connected with the heating network return water outlet of the hot water type absorption heat pump 5; a heating network water outlet of the condenser 10 is connected with a heating network water inlet of the power plant water-water heat exchanger 9; a heating network water outlet of the power plant water-water heat exchanger 9 is connected with a heating network water inlet of the steam type absorption heat pump 7 for recovering flue gas waste heat; a heating network water outlet of the steam type absorption heat pump 7 for recovering flue gas waste heat is connected with a heating network water inlet of the steam type absorption heat pump 11 for recovering exhaust steam waste heat; a heating network water outlet of the steam type absorption heat pump 11 for recovering exhaust steam waste heat is connected with a heating network water inlet of the steam-water heat exchanger 8, an intermediate cooling circulating water outlet and an intermediate cooling circulating water inlet of the steam type absorption heat pump 11 for recovering exhaust steam waste heat are respectively connected with an intermediate cooling circulating water inlet and an intermediate cooling circulating water outlet of the condenser 10; and a heating network water outlet of the steam-water heat exchanger 8 is connected with a heating network supply water inlet of the hot water type absorption heat pump 5. A drain water outlet of the steam type absorption heat pump 7 for recovering flue gas waste heat, a drain water outlet of the steam-water heat exchanger 8, a drain water outlet of the condenser 10 and a drain water outlet of the steam type absorption heat pump 11 for recovering exhaust steam waste heat are connected to the drain water inlet of the waste heat boiler 2; an extraction steam inlet of the steam type absorption heat pump 7 for recovering flue gas waste heat, an extraction steam inlet of the steam-water heat exchanger 8 and an extraction steam inlet of the steam type absorption heat pump 11 for recovering exhaust steam waste heat are connected to the extraction steam outlet of the steam turbine 4; and an exhaust steam inlet of the condenser 10 is connected to an exhaust steam outlet of the steam turbine 4.

In one preferred embodiment, a water pump 12 is arranged between the thermal station and the heating network return water heating system and is used for delivering heating network low-temperature return water in the thermal station to the heating network return water heating system. Based on the gas-steam combined cycle centralized heat supply device provided in the above-mentioned embodiments, the present invention further provides a gas-steam combined cycle centralized heat supply method, which comprises the following steps:

1) In a gas-steam combined cycle system, natural gas and air are mixed and combusted in a combustion chamber of a gas turbine 1 to produce high-temperature flue gas, and the high-temperature flue gas flows into a combustion turbine of the gas turbine 1 to expand to do work and drive a power generator to generate power; after doing work, the flue gas enters a waste heat boiler 2 to heat boiler supply water in the waste heat boiler 2 so as to produce high-temperature steam in the waste heat boiler 2; the flue gas exhausted from the waste heat boiler 2 enters a direct contact type flue gas condensation heat exchanger 3, is cooled and then is exhausted into the atmosphere, the high-temperature steam produced in the waste heat boiler 2 enters a steam turbine 4 to do work to generate power, extraction steam is extracted from the steam turbine 4 and the extracted extraction steam enters a heating network return water heating system.

2) heating network low-temperature return water which is drained from the thermal station, enters the heating network return water heating system and is heated in the heating network return water heating system, and the heated heating network low-temperature return water is used as heating network high-temperature supply water which is returned to the thermal station, wherein intermediate medium water produced in the heating network return water heating system enters the direct contact type flue gas condensation heat exchanger 3 and is heated by flue gas in the direct contact type flue gas condensation heat exchanger 3, and the heated intermediate medium water is returned to the heating network return water heating system; and extraction steam condensate produced in the heating network return water heating system is returned to the steam boiler 2.

3) The heating network high-temperature supply water returned to the thermal station is firstly used as a driving heat source, enters a hot water type absorption heat pump 5, emits heat and is cooled in the hot water type absorption heat pump 5, then enters a water-water heat exchanger 6 in the thermal station to heat user supply water, is cooled in the water-water heat exchanger 6 in the thermal station, then again enters the hot water type absorption heat pump 5 as low-grade heat source, finally emits heat and is cooled to the designed temperature of heating network low-temperature return water and is used as the heating network low-temperature return water to enter the heating network return water heating system from the thermal station.

The above-mentioned embodiments are only used for describing the present invention. Structures, connecting manners, manufacturing processes and the like of components therein are variable. Equivalent transformations and improvements made on the basis of the technical solution of the present invention shall not be excluded from the protection range of the present invention.

The invention claimed is:

1. A gas-steam combined cycle centralized heat supply device, characterized in that the gas-steam combined cycle centralized heat supply device comprises a gas-steam combined cycle system, a heating network return water heating system, and a thermal station, and the gas-steam combined cycle system is connected with the thermal station through the heating network return water heating system;

wherein the gas-steam combined cycle system comprises a gas turbine, a waste heat boiler, a direct contact type flue gas condensation heat exchanger, and a steam turbine;

the heating network return water heating system comprises a steam type absorption heat pump for recovering flue gas waste heat, a steam-water heat exchanger, and a power plant water-water heat exchanger;

the thermal station comprises a hot water type absorption heat pump and a water-water heat exchanger;

an exhaust port of the gas turbine is connected with a flue gas inlet of the waste heat boiler; a flue gas outlet of the waste heat boiler is connected with a flue gas inlet of the direct contact type flue gas condensation heat exchanger, a steam outlet of the waste heat boiler is connected with an extraction steam inlet of the steam turbine, and a drain water inlet of the waste heat boiler is connected with a drain water outlet of the steam type absorption heat pump for recovering flue gas waste heat and a drain water outlet of the steam-water heat exchanger; a first intermediate medium water inlet and a first intermediate medium water outlet of the direct contact type flue gas condensation heat exchanger are respectively connected to an intermediate medium water outlet and an intermediate medium water inlet of the steam type absorption heat pump for recovering flue gas waste heat, and a second intermediate medium water inlet and a second intermediate medium water outlet of the direct contact type flue gas condensation heat exchanger are respectively connected to an intermediate medium water outlet and an intermediate medium water inlet of the power plant water-water heat exchanger; an extraction steam outlet of the steam turbine is connected to an extraction steam inlet of the steam type absorption heat pump for recovering flue gas waste heat and an extraction steam inlet of the steam-water heat exchanger; and a heating network water inlet of the power plant water-water heat exchanger is connected with the heating network return water outlet of the hot water type absorption heat pump, and a heating network water outlet of the power plant water-water heat exchanger is connected with a heating network water inlet of the steam type absorption heat pump for recovering flue gas waste heat; a heating network water outlet of the steam type absorption heat pump for recovering flue gas waste heat is connected with a heating network water inlet of the steam-water heat exchanger, and a heating network water outlet of the steam-water heat exchanger is connected with a heating network supply water inlet of the hot water type absorption heat pump; and the heating network return water outlet and the heating network supply water inlet of the hot water type absorption heat pump are connected to a heating network return water heating system, a heating network supply water outlet of the hot water type absorption heat pump is connected with a heating network supply water inlet of the water-water heat exchanger, and a heating network return water inlet of the hot water type absorption heat pump is connected with a heating network supply water outlet of the water-water heat exchangers;

wherein the heating network return water heating system is coupled with the thermal station via a closed water-cycling circuit which runs through the steam- water heat exchanger, the steam type absorption heat pump, the power plant water- water heat exchanger, the hot water type absorption heat pump, and the water- water heat exchanger, so as to further utilize the waste heat from the steam-water heat exchanger, the steam type absorption heat pump, and the power plant water- water heat exchanger to heat user supply water in the thermal station.

2. The gas-steam combined cycle centralized heat supply device according to claim 1, characterized in that the heating network return water heating system comprises a condenser; a heating network water outlet of the power plant water-water heat exchanger is connected with a heating network water inlet of the condenser;
- a heating network water outlet of the condenser is connected with a heating network water inlet of the steam type absorption heat pump for recovering flue gas waste heat;
- a drain water outlet of the steam-water heat exchanger and a drain water outlet of the condenser are connected to the drain water inlet of the waste heat boiler;
- an extraction steam inlet of the steam type absorption heat pump for recovering flue gas waste heat and an extraction steam inlet of the steam-water heat exchanger are connected to the extraction steam outlet of the steam turbine; and an exhaust steam inlet of the condenser is connected to an exhaust steam outlet of the steam turbine.

3. The gas-steam combined cycle centralized heat supply device according to claim 1, characterized in that the heating network return water heating system comprises a condenser;
- a heating network water inlet of the condenser is connected with the heating network return water outlet of the hot water type absorption heat pump, a heating network water outlet of the condenser is connected with a heating network water inlet of the power plant water-water heat exchanger;
- a drain water outlet of the steam type absorption heat pump for recovering flue gas waste heat, a drain water outlet of the steam-water heat exchanger and a drain water outlet of the condenser are connected to the drain water inlet of the waste heat boiler, and
- an extraction steam inlet of the steam type absorption heat pump for recovering flue gas waste heat and an extraction steam inlet of the steam-water heat exchanger are connected to the extraction steam outlet of the steam turbine; and
- an exhaust steam inlet of the condenser is connected to an exhaust steam outlet of the steam turbine.

4. The gas-steam combined cycle centralized heat supply device according to claim 1, characterized in that the heating network return water heating system comprises a condenser; a heating network water inlet of the power plant water-water heat exchanger and a heating network water inlet of the condenser are connected with the heating network return water outlet of the hot water type absorption heat pump;
- a heating network water outlet of the power plant water-water heat exchanger and a heating network water outlet of the condenser are connected with a heating network water inlet of the steam type absorption heat pump for recovering flue gas waste heat;
- a drain water outlet of the steam type absorption heat pump for recovering flue gas waste heat, a drain water outlet of the steam-water heat exchanger and a drain water outlet of the condenser are connected to the drain water inlet of the waste heat boiler;
- an extraction steam inlet of the steam type absorption heat pump for recovering flue gas waste heat and an extraction steam inlet of the steam-water heat exchanger are connected to the extraction steam outlet of the steam turbine; and
- an exhaust steam inlet of the condenser is connected to an exhaust steam outlet of the steam turbine.

5. The gas-steam combined cycle centralized heat supply device according to claim 1, characterized in that the heating network return water heating system comprises a condenser and a steam type absorption heat pump for recovering exhaust steam waste heat;
- a heating network water inlet of the steam type absorption heat pump for recovering exhaust steam waste heat is connected with the heating network return water outlet of the hot water type absorption heat pump, and a heating network water outlet of the steam type absorption heat pump for recovering exhaust steam waste heat is connected with a heating network water inlet of the steam type absorption heat pump for recovering flue gas waste heat;
- an intermediate cooling circulating water outlet and an intermediate cooling circulating water inlet of the steam type absorption heat pump for recovering exhaust steam waste heat are respectively connected with an intermediate cooling circulating water inlet and an intermediate cooling circulating water outlet of the condenser;
- a drain water outlet of the steam type absorption heat pump for recovering flue gas waste heat, a drain water outlet of the steam-water heat exchanger, a drain water outlet of the condenser and a drain water outlet of the steam type absorption heat pump for recovering exhaust steam waste heat are connected to the drain water inlet of the waste heat boiler;
- an extraction steam inlet of the steam type absorption heat pump for recovering flue gas waste heat, an extraction steam inlet of the steam-water heat exchanger and an extraction steam inlet of the steam type absorption heat pump for recovering exhaust steam waste heat are connected to the extraction steam outlet of the steam turbine; and
- an exhaust steam inlet of the condenser is connected to an exhaust steam outlet of the steam turbine.

6. The gas-steam combined cycle centralized heat supply device according to claim 1, characterized in that the heating network return water heating system comprises a condenser and a steam type absorption heat pump for recovering exhaust steam waste heat; a heating network water outlet of the power plant water-water heat exchanger is connected with a heating network water inlet of the steam type absorption heat pump for recovering exhaust steam waste heat;
- a heating network water outlet of the steam type absorption heat pump for recovering exhaust steam waste heat is connected with a heating network water inlet of the steam type absorption heat pump for recovering flue gas waste heat; an intermediate cooling circulating water outlet and an intermediate cooling circulating water inlet of the steam type absorption heat pump for recovering exhaust steam waste heat are respectively connected with an intermediate cooling circulating water inlet and an intermediate cooling circulating water outlet of the condenser;

a drain water outlet of the steam type absorption heat pump for recovering flue gas waste heat, a drain water outlet of the steam-water heat exchanger, a drain water outlet of the condenser and a drain water outlet of the steam type absorption heat pump for recovering exhaust steam waste heat are connected to the drain water inlet of the waste heat boiler;

an extraction steam inlet of the steam type absorption heat pump for recovering flue gas waste heat, an extraction steam inlet of the steam-water heat exchanger and an extraction steam inlet of the steam type absorption heat pump for recovering exhaust steam waste heat are connected to the extraction steam outlet of the steam turbine; and an exhaust steam inlet of the condenser is connected to an exhaust steam outlet of the steam turbine.

7. The gas-steam combined cycle centralized heat supply device according to claim 1, characterized in that the heating network return water heating system comprises a condenser and a steam type absorption heat pump for recovering exhaust steam waste heat;

a heating network water inlet of the condenser is connected with the heating network return water outlet of the hot water type absorption heat pump; a heating network water outlet of the condenser is connected with a heating network water inlet of the power plant water-water heat exchanger;

a heating network water outlet of the steam type absorption heat pump for recovering flue gas waste heat is connected with a heating network water inlet of the steam type absorption heat pump for recovering exhaust steam waste heat;

a heating network water outlet of the steam type absorption heat pump for recovering exhaust steam waste heat is connected with a heating network water inlet of the steam-water heat exchanger, an intermediate cooling circulating water outlet and an intermediate cooling circulating water inlet of the steam type absorption heat pump for recovering exhaust steam waste heat are respectively connected with an intermediate cooling circulating water inlet and an intermediate cooling circulating water outlet of the condenser;

a drain water outlet of the steam type absorption heat pump for recovering flue gas waste heat, a drain water outlet of the steam-water heat exchanger, a drain water outlet of the condenser and a drain water outlet of the steam type absorption heat pump for recovering exhaust steam waste heat are connected to the drain water inlet of the waste heat boiler;

an extraction steam inlet of the steam type absorption heat pump for recovering flue gas waste heat, an extraction steam inlet of the steam-water heat exchanger and an extraction steam inlet of the steam type absorption heat pump for recovering exhaust steam waste heat are connected to the extraction steam outlet of the steam turbine; and an exhaust steam inlet of the condenser is connected to an exhaust steam outlet of the steam turbine.

\* \* \* \* \*